United States Patent
Huo

(10) Patent No.: US 9,442,330 B2
(45) Date of Patent: Sep. 13, 2016

(54) EMBEDDED TOUCH SCREEN LIQUID CRYSTAL DISPLAY DEVICE AND TOUCH DRIVE METHOD THEREOF

(75) Inventor: Sitao Huo, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 129 days.

(21) Appl. No.: 14/353,005

(22) PCT Filed: Sep. 14, 2012

(86) PCT No.: PCT/CN2012/081426
§ 371 (c)(1),
(2), (4) Date: Jun. 23, 2014

(87) PCT Pub. No.: WO2013/075540
PCT Pub. Date: May 30, 2013

(65) Prior Publication Data
US 2014/0333582 A1   Nov. 13, 2014

(30) Foreign Application Priority Data

Nov. 25, 2011   (CN) .......................... 2011 1 0383654

(51) Int. Cl.
*G02F 1/1343* (2006.01)
*G06F 3/044* (2006.01)
(Continued)

(52) U.S. Cl.
CPC ..... *G02F 1/134336* (2013.01); *G02F 1/13338* (2013.01); *G06F 3/0412* (2013.01);
(Continued)

(58) Field of Classification Search
CPC ..................... G02F 1/13338; G02F 1/134309;
G02F 1/134363; G06F 3/0412; G06F 3/0416;
G06F 3/044; G06F 3/045; G06F 3/041;
G06F 1/3218; G09G 3/3696; G09G 3/3648
See application file for complete search history.

(56) References Cited

U.S. PATENT DOCUMENTS 7,864,503 B2 *   1/2011   Chang ..................... G06F 3/044
                                                        200/269
8,553,013 B2 *  10/2013   Kim ....................... G06F 3/0412
                                                        178/18.06
(Continued)

FOREIGN PATENT DOCUMENTS

CN       101038385 A     9/2007
CN       102109690 A     6/2011
(Continued)

OTHER PUBLICATIONS

International Search Report as issued in corresponding Application PCT/CN2012/081426, dated May 30, 2013.

*Primary Examiner* — Dwayne Bost
*Assistant Examiner* — Darlene M Ritchie
(74) *Attorney, Agent, or Firm* — Alston & Bird LLP

(57) ABSTRACT

An in-cell touch panel liquid crystal display device is disclosed. The display device includes a first substrate, a second substrate disposed opposite the first substrate, and a liquid crystal layer disposed between the first substrate and the second substrate. The display device also includes a common electrode layer disposed on a side of the second substrate facing the first substrate, where the common electrode layer includes a plurality of first common electrodes and a plurality of second common electrodes both arranged in a matrix. In addition, the first common electrodes and the second common electrodes are configured to detect a touched position on the in-cell touch panel liquid crystal display device.

20 Claims, 6 Drawing Sheets

(51) Int. Cl.
*G06F 3/041* (2006.01)
*G02F 1/1362* (2006.01)
*G02F 1/1333* (2006.01)

(52) U.S. Cl.
CPC ......... *G02F1/136286* (2013.01); *G06F 3/044* (2013.01); *G06F 2203/04103* (2013.01); *G06F 2203/04111* (2013.01)

(56) References Cited

U.S. PATENT DOCUMENTS

| | | | | |
|---|---|---|---|---|
| 8,792,060 B2* | 7/2014 | Oh | .................... | G02F 1/136227 257/299 |
| 8,922,521 B2* | 12/2014 | Hotelling | .............. | G06F 1/3218 178/18.06 |
| 2005/0225708 A1* | 10/2005 | Oke | ................. | G02F 1/134363 349/139 |
| 2008/0062140 A1* | 3/2008 | Hotelling | ............. | G09G 3/3648 345/173 |
| 2008/0129898 A1* | 6/2008 | Moon | ................. | G02F 1/13338 349/12 |
| 2009/0096764 A1* | 4/2009 | You | ......................... | G06F 3/045 345/174 |
| 2010/0066692 A1* | 3/2010 | Noguchi | ............... | G06F 3/0412 345/173 |
| 2010/0085497 A1* | 4/2010 | Chang | ................. | G09G 3/3648 349/37 |
| 2010/0128000 A1* | 5/2010 | Lo | .......................... | G06F 3/044 345/174 |
| 2010/0149116 A1* | 6/2010 | Yang | ..................... | G06F 3/0416 345/173 |
| 2010/0214262 A1* | 8/2010 | Ishizaki | .............. | G02F 1/13338 345/174 |
| 2011/0080353 A1* | 4/2011 | Kang | ..................... | G06F 3/044 345/173 |
| 2011/0298744 A1* | 12/2011 | Souchkov | .............. | G06F 3/044 345/174 |
| 2012/0099041 A1* | 4/2012 | Xie | ....................... | G02F 1/1343 349/42 |
| 2012/0133858 A1* | 5/2012 | Shin | .................... | G02F 1/13338 349/59 |
| 2012/0169647 A1* | 7/2012 | Kuo | ..................... | G06F 3/044 345/174 |
| 2012/0249436 A1* | 10/2012 | Choi | ................... | G02F 1/13338 345/173 |
| 2013/0050130 A1* | 2/2013 | Brown | .................... | G06F 3/044 345/174 |
| 2013/0057511 A1* | 3/2013 | Shepelev | ............... | G06F 3/044 345/174 |

FOREIGN PATENT DOCUMENTS

| | | |
|---|---|---|
| CN | 102214036 A | 10/2011 |
| CN | 102253781 A | 11/2011 |
| CN | 102541333 A | 7/2012 |
| TW | 201116886 A | 11/2009 |

* cited by examiner

EMBEDDED TOUCH SCREEN LIQUID CRYSTAL DISPLAY DEVICE AND TOUCH DRIVE METHOD THEREOF

CROSS-REFERENCES TO RELATED APPLICATIONS

This application is a U.S. national phase application of co-pending international patent application number PCT/CN2012/081426, filed Sep. 14, 2012 and entitled "IMBEDDED TOUCH SCREEN LIQUID CRYSTAL DISPLAY DEVICE AND TOUCH DRIVE METHOD THEREOF", which claims priority to Chinese patent application number 201110383654.3, filed Nov. 25, 2011 and entitled "IMBEDDED TOUCH SCREEN LIQUID CRYSTAL DISPLAY DEVICE AND TOUCH DRIVE METHOD THEREOF", the contents of which are incorporated herein by reference in their entirety.

TECHNICAL FIELD

The present invention relates to the field of liquid crystal displays, in particular to an in-cell touch panel liquid crystal display device and a touch driving method thereof.

BACKGROUND OF THE INVENTION

Due to its advantages such as light weight and thinness, a Liquid Crystal Display (LCD) device has gradually developed as one of the fastest growing flat panel displays. The LCD device displays images using liquid crystal material. The transmittance of the liquid crystals varies with the voltage applied to the liquid crystals, in order for displaying with different gray scales. Further, a color filter layer is placed in the direction of emitting lights for the purpose of displaying images or videos in color. Typically, the LCD device has an input portion including an operation interface, as well as a system portion for processing a signal inputted through the input portion, to display the images or videos by a control signal outputted from the system portion through unidirectional communication.

Recently, a touch panel is integrated with the LCD device to form a touch panel LCD device, so that a user's instruction can be directly inputted through the touch panel disposed on the LCD device, in order for more simple and convenient operations. With the touch panel disposed on the top of the LCD device, when the user touches a displayed icon with his/her finger or a light pen and selects a command to be executed, a touch point (i.e. a touched position) is detected by the touch panel and the LCD device is driven according to the command corresponding to the selected icon, to achieve the specific display. The touch panel can be used without other input means (such as a keyboard or a mouse) and without a keypad for a mobile product, therefore, the LCD device with the touch panel will be more and more widely applied in the display system.

Currently, the touch panel is simply assembled and used with the LCD device. In addition, interferences other than user touch signals need to be eliminated as much as possible during the operation of the touch panel, therefore, a transparent electrode shielding layer is typically disposed between a touch panel electrode layer for detecting the touched position and a common electrode layer of the LCD device, in order to reduce the affection of noise in the LCD device on the touch panel.

FIG. 1 is a schematic view of the structure of an existing touch panel LCD device. As shown in FIG. 1, the existing touch panel LCD device includes a LCD panel 10 and a touch panel 20 independent of and located above the LCD panel 10. The LCD panel 10 includes, from bottom to top, a lower polarizer 11, a lower glass substrate 12, a Thin Film Transistor (TFT) layer 13, a liquid crystal layer 14, a common electrode layer 15, a color filter layer 16, an upper glass substrate 17 and an upper polarizer 18. The touch panel 20 includes, from bottom to top, a transparent shielding layer 21, a glass substrate 22, a touch operating layer 23 and a protective layer 24, with the transparent shielding layer 21 being typically made of an Indium Tin Oxide (ITO) layer. In use, the image displayed by the LCD panel 10 is visible to the user through the touch panel 20, and the user is allowed to perform an information inputting operation by means of the touch panel 20, to implement a man-machine interaction process. However, such a way that the touch panel 20 and the LCD panel 10 are manufactured separately and then assembled together will inevitably increase the thickness of the touch panel LCD device, resulting in a complicated display system and a complex manufacturing process, as well as high costs. Furthermore, although the transparent shielding layer 21 can effectively shield the impact on the touch panel 20 by the electric noise of the LCD panel 10, the provision of the Indium Tin Oxide (ITO) layer not only increases the difficulty of the manufacturing process, but also increases the overall thickness of the whole device, thereby negatively affecting the trend of lightening and thinning of the device.

BRIEF SUMMARY OF THE INVENTION

One inventive aspect is an in-cell touch panel liquid crystal display device. The display device includes a first substrate, a second substrate disposed opposite the first substrate, and a liquid crystal layer disposed between the first substrate and the second substrate. The display device also includes a common electrode layer disposed on a side of the second substrate facing the first substrate, where the common electrode layer includes a plurality of first common electrodes and a plurality of second common electrodes both arranged in a matrix. In addition, the first common electrodes and the second common electrodes are configured to detect a touched position on the in-cell touch panel liquid crystal display device.

Another inventive aspect is a method of driving an in-cell touch panel liquid crystal display device. The display device includes a first substrate, a second substrate disposed opposite the first substrate, and a liquid crystal layer disposed between the first substrate and the second substrate. The display device also includes a common electrode layer disposed on a side of the second substrate facing the first substrate, where the common electrode layer includes a plurality of first common electrodes and a plurality of second common electrodes both arranged in a matrix. In addition, the first common electrodes and the second common electrodes are configured to detect a touched position on the in-cell touch panel liquid crystal display device. Furthermore, a common electrode layer of the device is time division multiplexed. The method includes providing a display signal to the common electrode layer in a display mode, and providing a touch detecting signal to the common electrode layer in a touch mode.

Another inventive aspect is a method of driving an in-cell touch panel liquid crystal display device. The display device includes a first substrate, a second substrate disposed opposite the first substrate, and a liquid crystal layer disposed between the first substrate and the second substrate. The display device also includes a common electrode layer disposed on a side of the second substrate facing the first substrate, where the common electrode layer includes a plurality of first common electrodes and a plurality of second common electrodes both arranged in a matrix. In addition, the first common electrodes and the second common electrodes are configured to detect a touched position on the in-cell touch panel liquid crystal display device. The method includes simultaneously providing a display signal and a touch detecting signal to a common electrode layer of the in-cell touch panel liquid crystal display device, and detecting a touched position on the in-cell touch panel liquid crystal display device while displaying an image.

DETAILED DESCRIPTION OF THE PREFERRED EMBODIMENTS

For the sake of better understanding on the above objects, features and advantages of the present invention, specific embodiments of the present invention will be described in detail below in conjunction with the accompanying drawings. In the following description, numerous specific details are set forth in order to fully understand the present invention. However, the present invention can be implemented in many ways other than those described herein, and similar deductions can be made by persons skilled in the art without departing from the contents of the present invention. Therefore, the present invention is not limited to the specific embodiments disclosed below.

As mentioned above in the section of technical background, a touch panel and a liquid crystal display device are typically manufactured separately and then assembled together in the prior art, which not only increases the thickness of the touch panel liquid crystal display device, but also complicates the device, furthermore, such manufacturing process leads to a more complex technique and higher costs. In view of this, in the present invention, the function of the touch panel is integrated between two substrates of the liquid crystal display device, and a plurality of first common electrodes and a plurality of second common electrodes both arranged in a matrix are employed to detect a touched position (i.e. a touch point) on the in-cell touch panel liquid crystal display device, thus eliminating the adhering of the touch panel onto the liquid crystal display device, so that the manufacturing process is simple, and the thickness of the whole liquid crystal display device is reduced.

Figure 1:
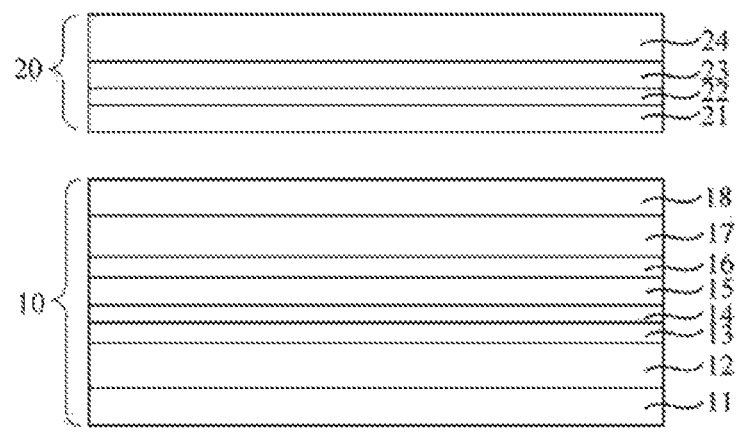
FIG. 1 is a schematic diagram of the structure of an existing touch panel liquid crystal display device.
Figure 2:
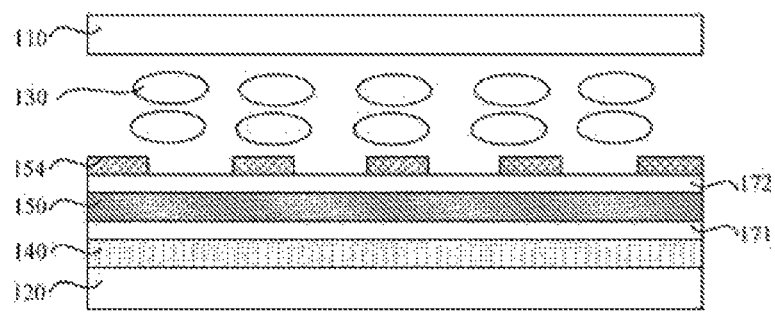
FIG. 2 is a schematic diagram of the structure of an in-cell touch panel liquid crystal display device according to a first embodiment of the present disclosure.
Figure 3:
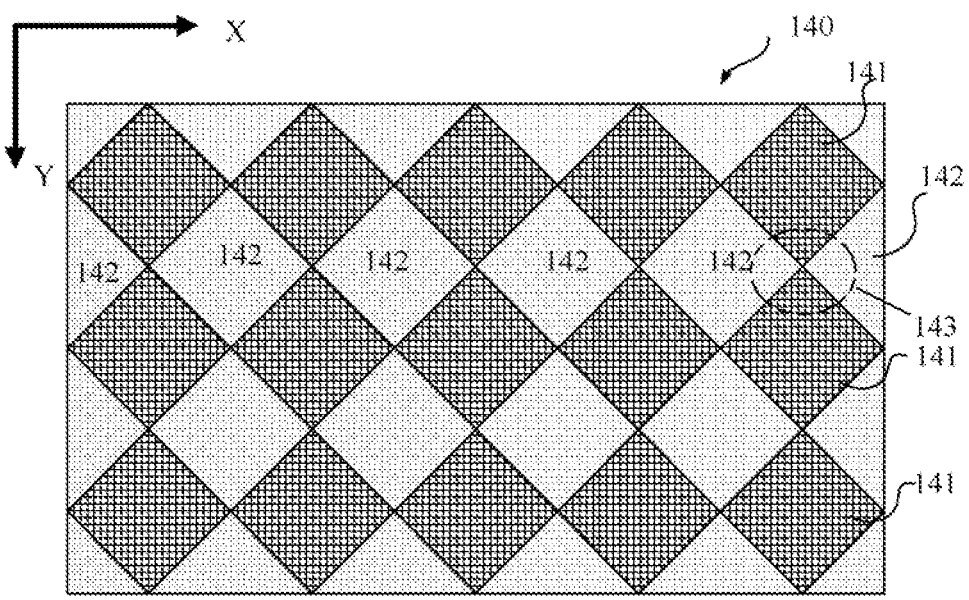
FIG. 3 is a schematic diagram of the distribution of a common electrode layer in FIG. 2.
Figure 4:
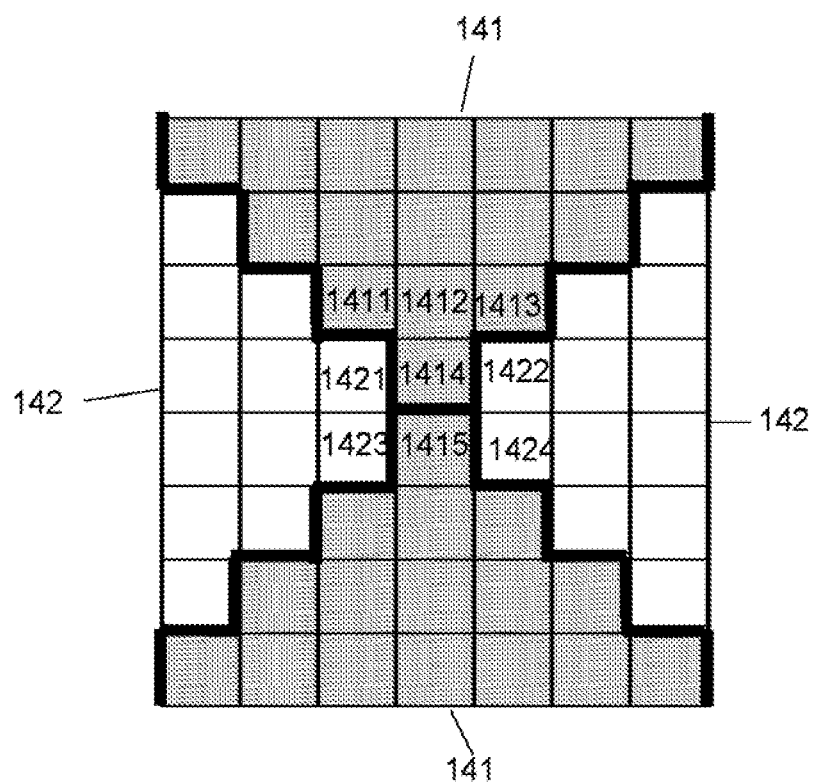
FIG. 4 is an enlarged view of a portion within a circle in FIG. 3.
Figure 5:
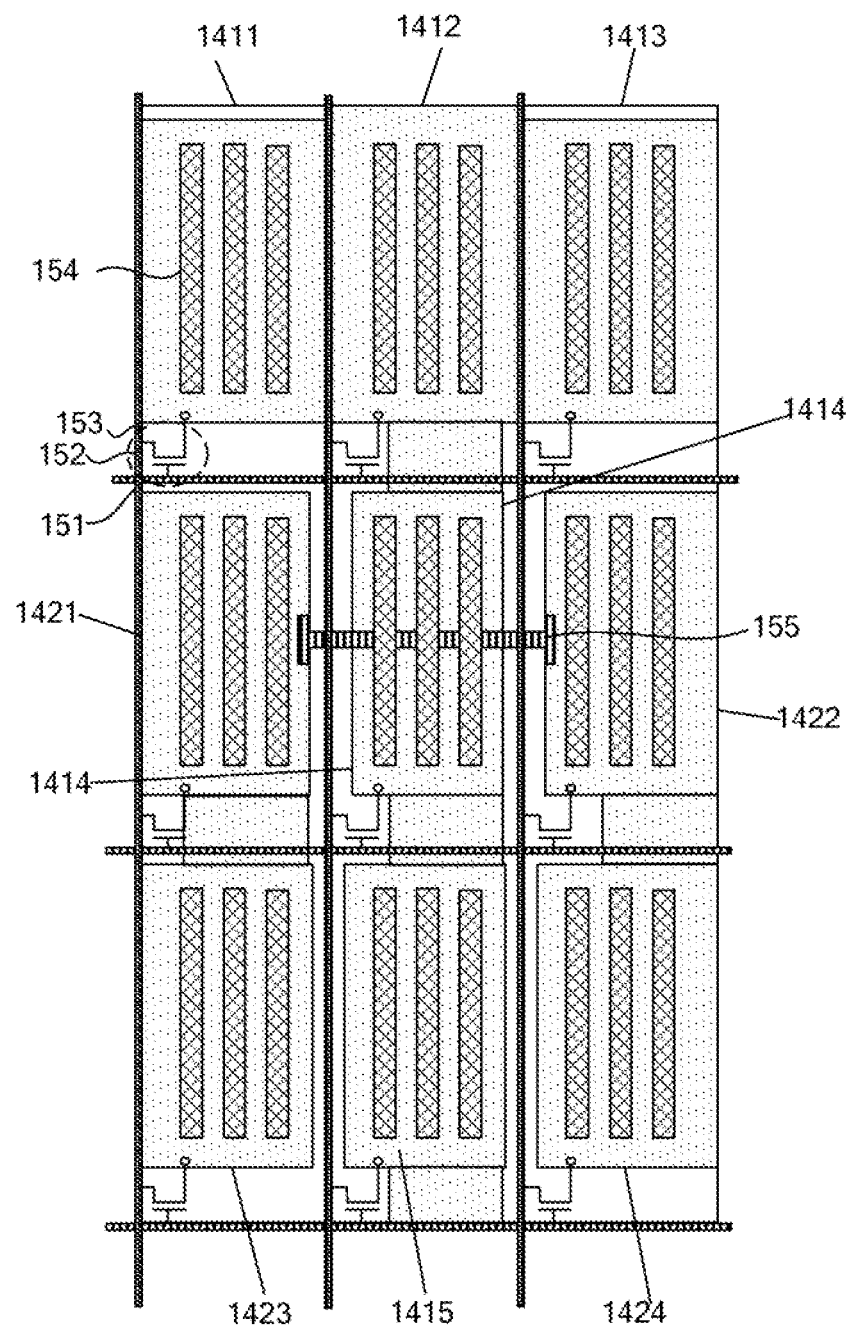
FIG. 5 is a schematic diagram of the structure of pixels shown in FIG. 4.
Figure 6:
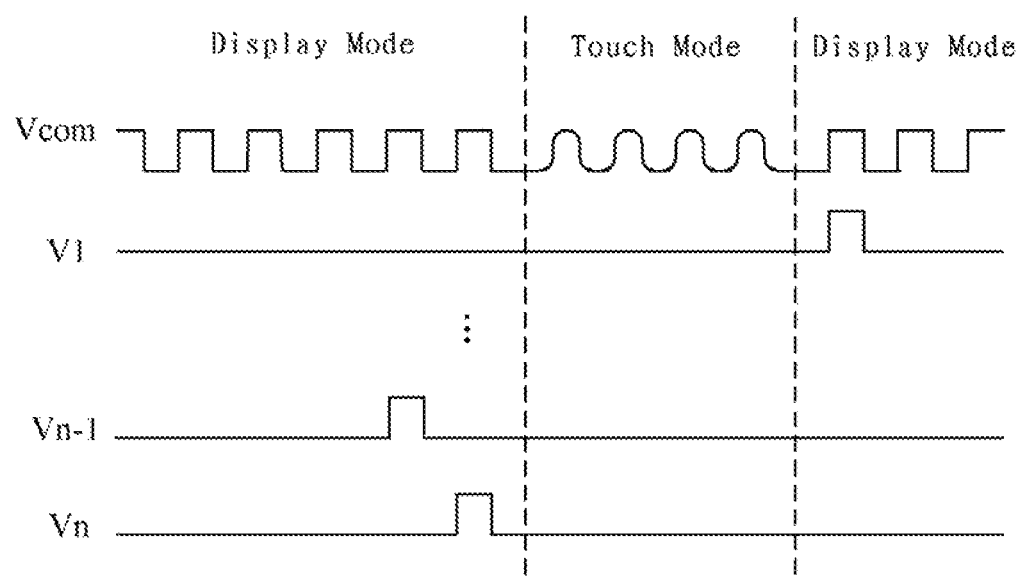
FIG. 6 is a timing diagram of a touch driving method of the in-cell touch panel liquid crystal display device according to the first embodiment of the present disclosure.

Reference is made to FIGS. 2 to 6, in which FIG. 2 is a schematic diagram of the structure of an in-cell touch panel liquid crystal display device according to a first embodiment; FIG. 3 is a schematic diagram of the distribution of a common electrode layer in FIG. 2; FIG. 4 is an enlarged view of a portion enclosed by a circle in FIG. 3; FIG. 5 is a schematic diagram of the structure of pixels shown in FIG. 4; and FIG. 6 is a timing diagram of a touch driving method of the in-cell touch panel liquid crystal display device according to the first embodiment.

As shown in FIGS. 2 to 5, an in-cell touch panel liquid crystal display device of the first embodiment includes:

a first substrate 110 and a second substrate 120 disposed opposite to each other;

a liquid crystal layer 130 disposed between the first substrate 110 and the second substrate 120; and a common electrode layer 140 disposed on a side of the second substrate 120 that faces the first substrate 110;

where the common electrode layer 140 includes a plurality of first common electrodes 141 and a plurality of second common electrodes 142 both arranged in a matrix, with the first common electrodes 141 and the second common electrodes 142 being configured for detecting a touched position on the in-cell touch panel liquid crystal display device.

In the first embodiment, the first substrate 110 is provided at the top and the second substrate 120 is provided at the bottom. A user can view the display of the liquid crystal display device from a side of the first substrate 110, and perform a touch operation on a side of the second substrate 120. The common electrode layer 140 is etched to form the plurality of first common electrodes 141 and the plurality of second common electrodes 142 both arranged in a matrix. In the first embodiment, each of the first common electrodes 141 and the second common electrodes 142 has a rhombic shape, but may have another shape as desired.

In the first embodiment of the present invention, the plurality of first common electrodes 141 are arranged in rows in a second direction (e.g., a direction Y) with adjacent two first common electrodes in each row being electrically connected, so as to function as drive lines, and the plurality of second common electrodes 142 are arranged in rows in a first direction (e.g., a direction X) with adjacent two first common electrodes in each row being electrically connected, so as to function as sense lines, in order to detect the touched position (i.e. the touch point) on the in-cell touch panel liquid crystal display device. The touch layer is integrated within the liquid crystal display device, thus eliminating the adhering of the touch panel onto the liquid crystal display device, so that the manufacturing process is simple, and the thickness of the device is reduced.

It can be understood that the above arrangement of the first common electrodes 141 and the second common electrodes 142 is preferable in the present invention, but not intended to limit the present invention, and the specific amount of pixel units, the common electrodes of which form one touch region, may depend on actual touch requirements, for example, depend on the general user's finger size. That is, any manner of dividing the common electrode layer into two intersecting parts for detecting the touch point is within the scope of the present invention.

Specifically, adjacent two first common electrodes 141 in each row are directly electrically connected together with each other in the direction Y, while the plurality of second common electrodes 142 are not directly connected to each other. FIGS. 4 and 5 schematically show nine pixel units 1411, 1412, 1413, 1414, 1415, 1421, 1422, 1423, and 1424, it may be understood that each of the first common electrodes and the second common electrodes is formed by common electrodes of a plurality of pixel units, for example, the pixel units 1411, 1412, 1413, and 1414 belong to one first common electrode 141, while the pixel unit 1415 belongs to another first common electrode 141 connected with said one first common electrode 141; likewise, the pixel units 1421 and 1423 belong to one second common electrode 142, while the pixel units 1422 and 1424 belong to another second common electrode 142 connected with said one second common electrode 142.

Next, the structure within the circle 143 in FIG. 3 will be described in more detail. As shown in FIGS. 4 and 5, two adjacent first common electrodes 141 are directly connected through the common electrodes of the adjacent pixel units 1414, 1415; while two adjacent second common electrodes 142 are electrically connected by a metal bridge 155 connecting the common electrodes of the adjacent pixel units respectively from these two adjacent second common electrodes 142. The plurality of second common electrodes 142 may be electrically connected in the direction X by the metal bridges. The metal bridge 155 may be implemented in various ways, such as by etching a separate layer of metal to form the metal bridge. However, in the first embodiment, the existing metal layer is utilized to form the metal bridge 155 to simplify the manufacturing process.

In the first embodiment of the present invention, the in-cell touch panel liquid crystal display device may be a liquid crystal display device of an In-Plane Switching (IPS) or Fringe Field Switching (FFS) mode, where the IPS/FFS mode is a liquid driving mode capable of broadening the visual angle, and the pixel electrodes in an array substrate in the IPS/FFS mode are strip-shaped to form a horizontal electric field.

In the first embodiment, the in-cell touch panel liquid crystal display device is an IPS-type liquid crystal display device, and further includes a TFT layer 150 disposed on the second substrate 120, and the TFT layer 150 includes scan lines 151 and data lines 152 intersecting with the scan lines 151, with TFTs 153 being formed in pixel regions defined by the scan lines 151 and the data lines 152. The TFT 153 includes: a gate electrode electrically connected to the scan line 151, as well as a gate insulating layer, a semiconductor layer, a source electrode and a drain electrode which are disposed on the gate electrode. A pixel electrode 154 disposed on the second substrate 120 is electrically connected with the drain electrode of the TFT 153 through a through hole (not shown), and the source electrode of the TFT 153 is electrically connected with the data line 152. The scan line 151 and the gate electrode, which are typically formed in the same process step, are in the same layer and can be formed integrally; in addition, the metal forming the source electrode of the TFT and the metal forming the drain electrode, which are typically formed in the same process step, are in the same layer and collectively referred to as a source/drain electrode metal layer. In general, the source/drain electrode metal layer and the gate electrode metal layer are inevitably formed in the process of manufacturing the TFT layer 150, thus in the first embodiment, the connection of two second common electrodes in the direction X is implemented by the metal bridge which is made by the metal located in the same layer with the scan line 151, because the scan line 151 is also provided in the direction X. The in-cell touch panel liquid crystal display device further includes a first insulating layer 171 disposed between the common electrode layer 140 and the TFT layer 150, and a second insulating layer 172 disposed between the common electrode layer 140 and the pixel electrode 154.

In the first embodiment, preferably, the outer side of the first substrate 110 is further provided with a shielding layer. To reduce the impact on the in-cell touch panel liquid crystal display device by any external noise, the shielding layer is typically disposed at the outer side of the in-cell touch panel liquid crystal display device. In the first embodiment, the common electrode layer 140 is arranged on a side of the second substrate 120 and is configured to shield the noise external to the second substrate 120, meanwhile, it is also required to arranged a shielding layer at the outer side of the first substrate 110 to shield the noise from the external of the first substrate 110.

Further, the in-cell touch panel liquid crystal display device further includes a display signal generating unit and a touch detecting signal generating unit (not shown), where the display signal generating unit is configured for providing a display signal to the common electrode layer 140 (including the first common electrodes 141 and the second common electrodes 142), and the touch detecting signal generating unit is configured for providing a touch detecting signal to the common electrode layers 140. The touch detecting signal includes an excitation signal and a detection signal. In the first embodiment, the touch detecting signal generating unit is configured for providing the excitation signal to the first common electrodes 141 serving as driving electrodes, and providing the detection signal to the second common electrodes 142 serving as sensing electrodes. Alternatively, in other specific embodiments of the present invention, it is possible that the touch detecting signal generating unit provides the excitation signal to the second common electrode, and provides the detection signal to the first common electrode.

The first embodiment also provides a touch driving method for the in-cell touch panel liquid crystal display device described as above, and the common electrode layer 140 is used in a time division multiplexing manner in the method. The in-cell touch panel liquid crystal display device has two operating modes, i.e. a display mode and a touch mode. In the display mode, the display signal is provided to the common electrode layer 140, so that the in-cell touch panel liquid crystal display device operates for displaying; while in the touch mode, the touch detecting signal is provided to the common electrode layer 140, so that the in-cell touch panel liquid crystal display device operates for touch detecting.

As shown in FIG. 6, at the beginning of each frame, the in-cell touch panel liquid crystal display device firstly operates in the display mode, where the display signal includes a pixel selecting signal and a data signal, the display signal generating unit provides a common voltage Vcom to the first common electrodes 141 and the second common electrodes 142 and provides the pixel selecting signal in order to apply scanning voltages V1 . . . , Vn−1, Vn, which are higher than the turning-on threshold voltage of the TFTs, to the scan lines 151 line by line, so that the TFTs are turned on line by line due to the scanning voltages; further, the display signal generating unit provides a data signal to the data lines 152, to send the data signal to each of the TFTs through the data lines 152. As a result, an electric field in parallel with the first substrate 110 and the second substrate 120 is formed between the strip-shaped pixel electrodes 154 and the common electrode layer 140 and causes liquid crystal molecules to deflect along the direction of the electric field, so that the liquid crystal display array operates to display an image, and each of pixel units operates for displaying properly.

When the in-cell touch panel liquid crystal display device subsequently operates in the touch mode, a touch can be detected by controlling the first common electrodes 141 and the second electrodes 142. For example, in a mutual capacitance mode, the first common electrodes 141 serve as driving electrodes and the second common electrodes 142 serve as sensing electrodes, the excitation signal is provided to the first common electrodes 141 and the detection signal is provided to the second common electrodes 142, so that a mutual capacitance is present at an overlapping position between the first common electrode 141 and the second common electrode 142. If the in-cell touch panel liquid crystal display device is touched by a finger, partial current will flow to the finger, which is equivalent to that the mutual capacitance changes, so that the detection signal on the second common electrode 142 serving as the sensing electrode changes, thereby detecting whether the finger touches the in-cell touch panel liquid crystal display device. Alternatively, it is possible that the second common electrodes 142 serve as driving electrodes and the first common electrodes 141 server as sensing electrodes, and the excitation signal is provided to the second common electrodes 142 and the detection signal is provided to the first common electrodes 141, to likewise achieve the object of the present invention.

When the frame is ended and the next frame is started, the in-cell touch panel liquid crystal display device operates in the display mode once again, and the above-mentioned alternating process is repeated. Of course, the foregoing description is merely a specific embodiment of the present invention, depending on the specific timing distribution within the time period in each frame in the touch driving method of the present invention, and thus the present invention is not limited to the above-mentioned manner in which the display mode is followed by the touch mode. Alternatively, it is possible that the touch mode is followed by the display mode in each frame. Other control solutions employed in the above touch driving method may also be deduced reasonably by those skilled in the art according to the specific timing.

It can be known from the above description that, in the touch driving method in which the common electrode layer 140 is used in the time division multiplexing manner, the displaying time period and the touch detecting time period of the in-cell touch panel liquid crystal display device are separated from each other, so that the image displaying and the touch sensing do not impact on each other, thereby improving the accuracy of the touch sensing and the imaging quality of the in-cell touch panel liquid crystal display device.

Alternatively, the in-cell touch panel liquid crystal display device may be provided with another touch driving method, in which the display signal and the touch detecting signal are simultaneously provided to the common electrode layer 140 to detect the touched position on the in-cell touch panel liquid crystal display device while in the displaying of the pixels. That is, the display signal generating unit provides the display signal to the common electrode layer 140, and simultaneously, the touch detecting signal generating unit provides the touch detecting signal (including the excitation signal and the detection signal) to the common electrode layer 140, so that the in-cell touch panel liquid crystal display device simultaneously operates for touching and displaying. Typically, the touch detecting signal is a high frequency signal (having a relatively short cycle), and the display signal is a low frequency signal (having a relatively long cycle). As long as the equivalent DC component of the excitation signal is consistent with the common voltage Vcom, the pixel units are unresponsive due to the limited time, thus, it can be ensured that the touch detecting function is realized without compromising the image displaying of the liquid crystal display array, and the imaging quality can be guaranteed.

As such, in the in-cell touch panel liquid crystal display device provided by the first embodiment of the present invention, the function of a touch panel is integrated between those two substrates of the liquid crystal display device, and the first common electrodes and the second common electrodes intersecting with each other are employed to detect the touched position on the in-cell touch panel liquid crystal display device, thereby eliminating the adhering of the touch panel onto the liquid crystal panel of the liquid crystal display device, so that the manufacturing process is simple, and the thickness of the liquid crystal display device is reduced.

A second embodiment is different from the first embodiment in that, adjacent two first common electrodes in each row are connected in a first direction (i.e. a direction X) by directly connected common electrodes of adjacent pixel units, and adjacent two second common electrodes in each row are connected in a second direction (i.e. a direction Y) by metal bridges each connecting common electrodes of two vertically adjacent pixel units.

Figure 7:
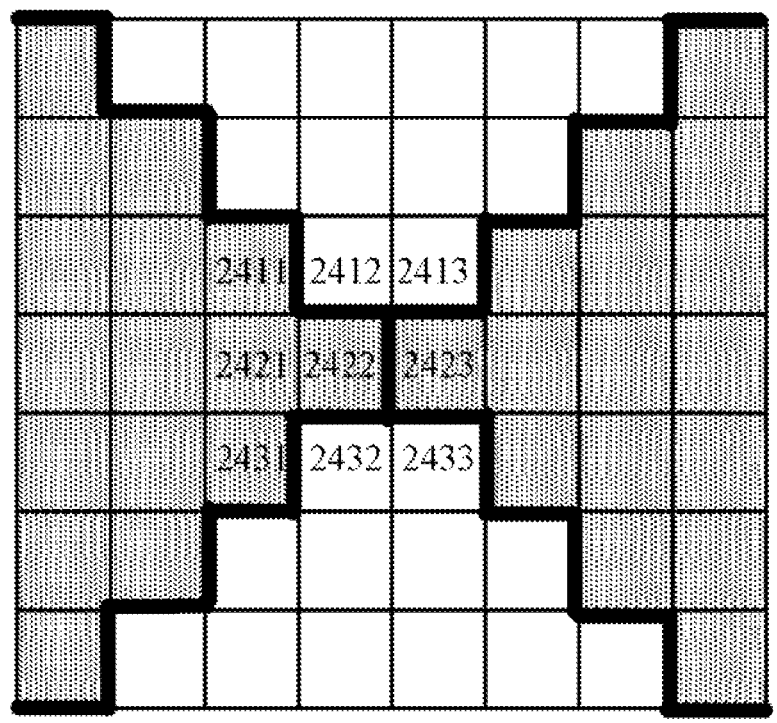
FIG. 7 is a schematic diagram showing the arrangement of the common electrodes of the in-cell touch panel liquid crystal display device according to a second embodiment of the present disclosure.
Figure 8:
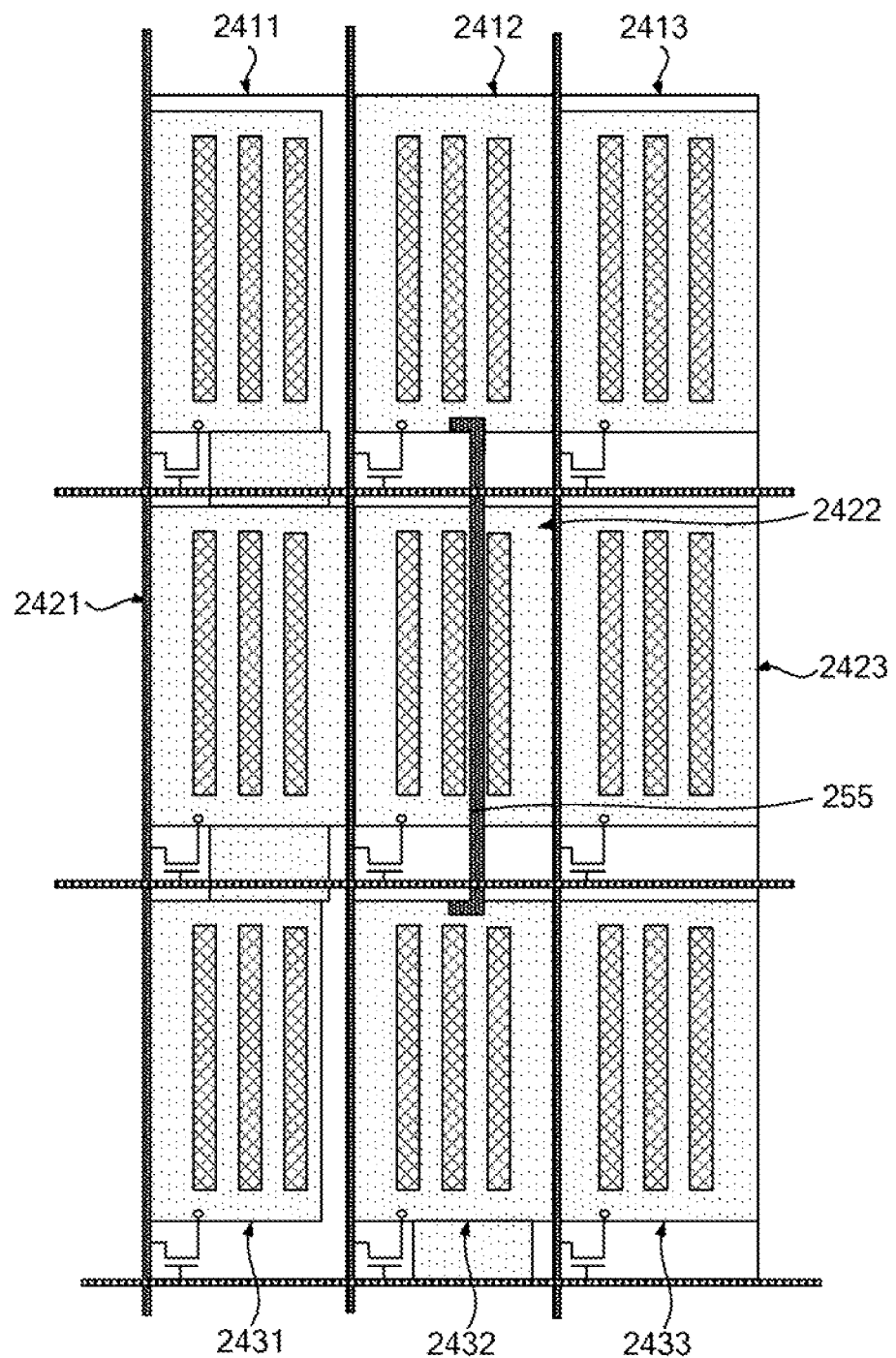
FIG. 8 is a schematic diagram showing the structure of pixels of the in-cell touch panel liquid crystal display device according to the second embodiment of the present disclosure.

Specifically, the common electrode layer is also etched to form a plurality of first common electrodes and a plurality of second common electrodes both arranged in a matrix. FIGS. 7 and 8 merely show nine pixel units 2411, 2412, 2413, 2421, 2422, 2423, 2431, 2432, and 2433, where the pixel units 2411, 2421, 2422, and 2431 are included in one first common electrode, and the pixel unit 2423 is included in another first common electrode; likewise, the pixel units 2412 and 2413 are included in one second common electrode, and the pixel unit 2432 and 2433 are included in anther second common electrode.

The adjacent two first common electrodes in each row are connected in the direction X by directly connected common electrodes of adjacent pixel units, and the adjacent two second common electrodes in each row are connected in the direction Y by the metal bridges 255 each connecting the common electrodes of two vertically adjacent pixel units. Similarly, the metal bridge 255 may be implemented in various ways, such as by etching a separate layer of metal to form the metal bridge. However, in the second embodiment, the existing metal layer is utilized. Specifically, to provide the metal bridges in the direction Y, a metal layer in the same layer with the data lines is used, because the data lines are also provided in the direction Y.

The operating manner of the in-cell touch panel liquid crystal display device in the second embodiment is the same as that in the first embodiment, and therefore is not described in detail here, but should be understood by those skilled in the art.

In the first embodiment of the present invention, two adjacent first common electrodes are directly connected in the second direction (e.g. a direction Y) through the common electrodes of adjacent pixel units respectively from these two adjacent first common electrodes; while two adjacent second common electrodes are electrically connected by the metal bridge connecting the common electrodes of the horizontally adjacent pixel units respectively from these two adjacent second common electrodes. In the second embodiment of the present invention, two adjacent first common electrodes are directly connected in the first direction (e.g. a direction X) through the common electrodes of two adjacent pixel units respectively from these two adjacent first common electrodes; while two adjacent second common electrodes are electrically connected by the metal bridge connecting the common electrodes of the vertically adjacent pixel units respectively from these two adjacent second common electrodes. However, it should be noted that in other embodiments of the present invention, adjacent first common electrodes may be connected by the metal bridge connecting the common electrodes of the adjacent pixel units respectively from these adjacent first common electrodes, while adjacent second common electrodes may also be connected by the metal bridge connecting the common electrodes of the adjacent pixel units respectively from these adjacent second common electrodes. For example, the first common electrodes are disposed in the same direction with the scan lines, the second common electrodes are disposed in the same direction with the data lines, the first common electrodes are electrically connected by the metal bridge located in the same layer with the scan lines, and the second common electrodes are electrically connected by the metal bridge located in the same layer with the data lines.

In the first and second embodiments of the present invention, a user can view the display of the liquid crystal display device from a side of the first substrate, and perform a touch operation on a side of the second substrate. However, in a third embodiment, the liquid crystal display device can be viewed and touched simultaneously from a side of the second substrate, that is, the common electrode layer, the TFT layer and the pixel electrodes are sequentially disposed at the inner side of the second substrate, and the common electrode layer may also have an effect of shielding the interference from the external signal. The shielding effect of the common electrode layer is like that of the transparent shielding layer employed in the traditional touch panel liquid crystal display device, to reduce the interference caused by the external electric field to the display of the liquid crystal display device, so that an additional specialized transparent shielding layer is unnecessary, thus reducing the difficulty of the manufacturing process and the manufacturing costs.

Figure 9:
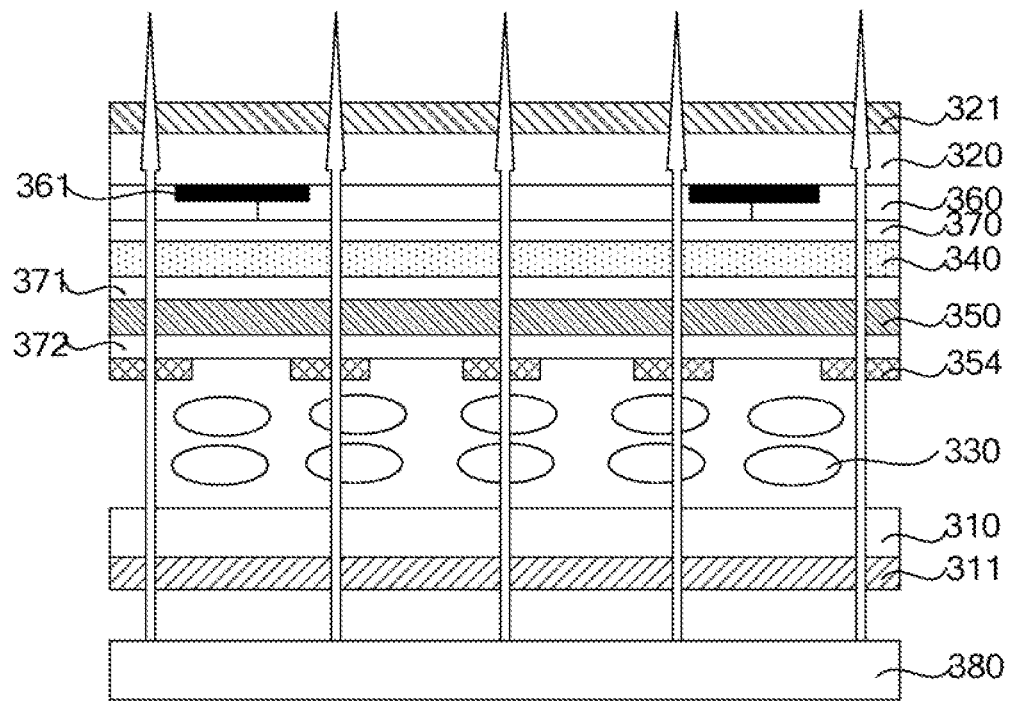
FIG. 9 is a schematic diagram of the structure of the in-cell touch panel liquid crystal display device according to a third embodiment of the present disclosure.

Specifically as shown in FIG. 9, the in-cell touch panel liquid crystal display device of the third embodiment includes:

a first substrate 310 and a second substrate 320 disposed opposite to each other;

a liquid crystal layer 330 disposed between the first substrate 310 and the second substrate 320; and a common electrode layer 340 disposed on a side of the second substrate 320 that faces the first substrate 310;

where the common electrode layer 340 includes a plurality of first common electrodes and a plurality of second common electrodes both arranged in a matrix, with the first common electrodes and the second common electrodes being configured for detecting a touched position on the in-cell touch panel liquid crystal display device.

Furthermore, the in-cell touch panel liquid crystal display device further includes a TFT layer 350 which is disposed on a side of the second substrate 320 that faces the first substrate 310, the TFT layer 350 includes scan lines and data lines intersecting with the scan lines, and TFTs are formed in pixel regions defined by the scan lines and the data lines. The TFT includes: a gate electrode electrically connected to the scan line, as well as a gate insulating layer, a semiconductor layer and a source/drain electrode metal layer which are sequentially disposed on the gate electrode, with the source electrode of the TFT being electrically connected with the data line.

Optionally, the TFT layer further includes an ohmic contact layer formed between the semiconductor layer and the source/drain electrode metal layer. The ohmic contact layer is made of N+ doped amorphous silicon for example, to form an ohmic contact. For the sake of concision, the gate insulating layer, the semiconductor layer and the ohmic contact layer are not indicated in the figures, but should be understood by those skilled in the art.

The in-cell touch panel liquid crystal display device of the third embodiment is a liquid crystal display device of an IPS mode or an FFS mode. Specifically, the in-cell touch panel liquid crystal display device further includes a color filter layer 360, a passivation layer 370, an upper polarizer 321, a lower polarizer 311 and a backlight 380. The color filter layer 360, which is disposed between the second substrate 320 and the common electrode layer 340, is configured for displaying in color; the passivation layer 370 is disposed between the color filter layer 360 and the common electrode layer 340; the upper polarizer 321 is disposed on a side of the second substrate 320 away from the first substrate 310; the lower polarizer 311 is disposed on a side of the first substrate 310 away from the second substrate 320; and the backlight 380 is disposed at a side of the lower polarizer 311. In the third embodiment, the color filter layer 360, the common electrode layer 340, and the TFT layer 350 are sequentially disposed on the same substrate, and the common electrode layer 340 has an effect of shielding the interference from the external signal, that is, the shielding effect of the common electrode layer 340 is like that of the transparent shield layer employed in the traditional touch panel liquid crystal display device, to reduce the noise interference, so that an additional specialized transparent shield layer is unnecessary, thus reducing the difficulty of the manufacturing process and the manufacturing costs.

As shown in FIG. 9, the in-cell touch panel liquid crystal display device further includes a first insulating layer 371 and a second insulating layer 372, where the first insulating layer 371 is disposed between the common electrode layer 340 and the TFT layer 350, and the second insulating layer 372 is disposed between the TFT layer 350 and the pixel electrodes 354, in order for an isolation effect. Further, to facilitate the production, the color filter layer 360 is formed across the entire second substrate 320, but a black matrix layer 361 is disposed on the portion of the second substrate 320 to be shielded. Alternatively, in other specific embodiments of the present invention, the color filter layer 360 and the black matrix layer 361 may be disposed alternately, rather than forming the color filter layer 360 across the entire second substrate 320.

In other embodiments, the color filter layer may also be formed on the outer side of the second substrate 320, which should falls into the scope of the present invention.

The distribution manner of the first common electrodes and the second common electrodes in the third embodiment is similar with that in the common electrode layer structure in the first embodiment or the second embodiment, and the touch driving method in the third embodiment is also similar with that in the first embodiment or the second embodiment, and will not be discussed in detail here.

Because the in-cell touch panel liquid crystal display device provided in the third embodiment may be viewed and touched simultaneously at a side of the second substrate 320, it is more convenient in use, and the backlight can be installed on a side of the first substrate 310, to provide a more uniform and stable light source, thereby enabling a better display effect.

In the third embodiment, because the backlight is installed on the side of the first substrate 310, a metal frame for the backlight can shield the signal noise from the outer side of the first substrate 310; meanwhile, because the in-cell touch panel liquid crystal display device can be viewed and touched by a user from a side of the second substrate 320, the common electrode layer 340 disposed above the pixel electrodes 354 and the TFT layer 350 and below a side of the second substrate 320 has an effect of shielding the signal noise from the outer side of the second substrate 320, to reduce the noise inference. Therefore, in the in-cell touch panel liquid crystal display device provided by the third embodiment, an additional specialized transparent shielding layer is unnecessary, thus reducing the difficulty of the manufacturing process and the manufacturing costs.

Figure 10:
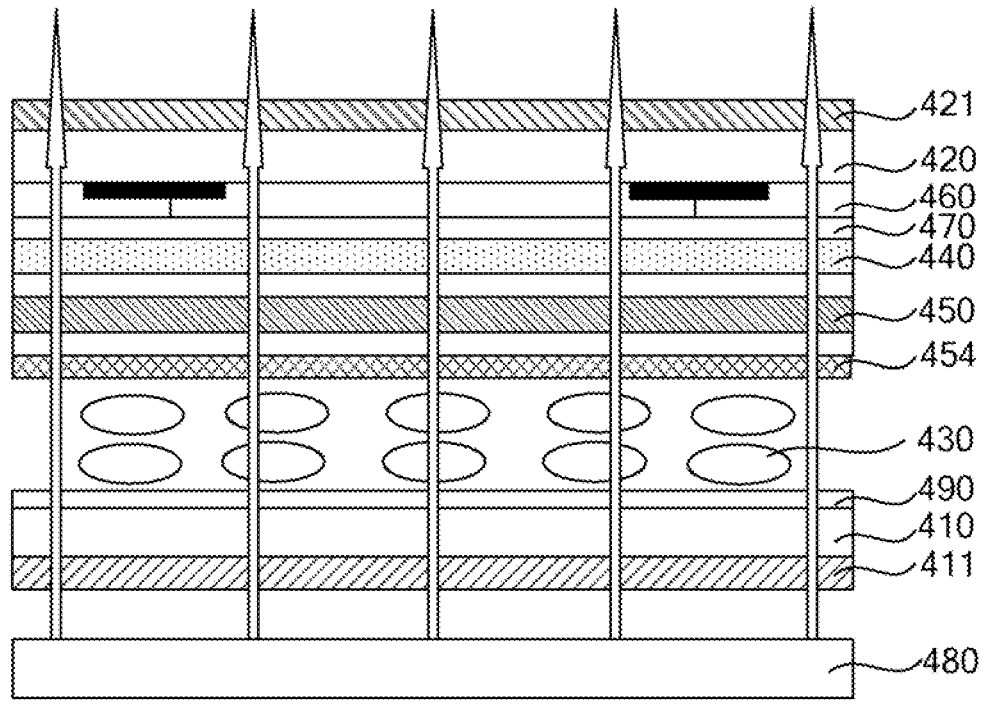
FIG. 10 is a schematic diagram of the structure of the in-cell touch panel liquid crystal display device according to a fourth embodiment of the present disclosure.

The present invention will be described in a fourth embodiment by taking an in-cell touch panel liquid crystal display device of a TN/AV mode, for example. As shown in FIG. 10, the in-cell touch panel liquid crystal display device includes:

a first substrate 410 and a second substrate 420 disposed opposite to each other;

a liquid crystal layer 430 disposed between the first substrate 410 and the second substrate 420; and a common electrode layer 440 disposed on a side of the second substrate 420 that faces the first substrate 410, where the common electrode layer 440 includes a plurality of first common electrodes and a plurality of second common electrodes both arranged in a matrix, with the first common electrodes and the second common electrodes being configured for detecting a touched position on the in-cell touch panel liquid crystal display device;

a TFT layer 450 disposed on the inner side of the second substrate 420;

a color filter layer 460 disposed between the second substrate 420 and the common electrode layer 440;

a passivation layer 470 disposed between the color filter layer 460 and the common electrode layer 440;

a lower polarizer 411 disposed on a side of the first substrate 410 away from the second substrate 420;

an upper polarizer 421 disposed on a side of the second substrate 420 away from the first substrate 410;

a backlight 480 disposed at a side of the lower polarizer 411; and a second common electrode layer 490 disposed on a side of the first substrate 410 that faces the second substrate 420.

Compared with the third embodiment, a vertical electric field is formed in the in-cell touch panel liquid crystal display device of the fourth embodiment, thus the second common electrode layer 490 need be formed on the first substrate 410. The distribution manner of the first common electrodes and the second common electrodes is the same with that in the common electrode layer structure in the first embodiment or second embodiment, in addition, the touch driving method of the in-cell touch panel liquid crystal display device is also similar with that in the first embodiment and the second embodiment.

As such, the in-cell touch panel liquid crystal display device of the present invention is not only applicable to the IPS/FFS mode, but also to the TN/AV mode or other modes.

In the present invention, the function of the touch panel is integrated between two substrates of the liquid crystal display device, the plurality of first common electrodes arranged and connected together in the first direction serve as drive lines, and the plurality of second common electrodes arranged and connected together in the second direction serve as sense lines, to detect the touched position on the in-cell touch panel liquid crystal display device, thereby eliminating the adhering of the touch panel to the liquid crystal panel of the liquid crystal display device, so that the manufacturing process is simple, the thickness of the liquid crystal display device is reduced, and the manufacturing costs are reduced.

It is noted that the above-mentioned in-cell touch panel liquid crystal display device is introduced merely as the preferred embodiment, and the amount of the layers in the in-cell touch panel liquid crystal display device can be increased or reduced by those skilled in the art according to actual production requirements, and types, materials and thicknesses of each layer can also be selected as needed, and will not be discussed in detail here.

In addition, in this specification, various embodiments are described by way of progressive manner, and each of the embodiments focuses on the difference with the other embodiments in terms of the illustration, and the same or similar parts between the various embodiments may refer to each other. Furthermore, the accompanying drawings are shown in a very simplified form and uses imprecise ratio, only for the purpose of being convenient and clear to the auxiliary illustration of the various embodiments of the present invention.

The above disclosed embodiments are described for implementing or using the present invention by those skilled in the art. It will be apparent that various modifications can be made to these embodiments by those skilled in the art, and the general principles defined herein can be implemented in other embodiments without departing from the sprint or the scope of the invention. Therefore, the present invention is not limited by the embodiments shown herein, rather conforms to the broadest range in accordance with the principles and novelty characteristics disclosed.

What is claimed is:

1. An in-cell touch panel liquid crystal display device, comprising:

a first substrate;

a second substrate disposed opposite the first substrate;

a liquid crystal layer disposed between the first substrate and the second substrate;

a common electrode layer disposed on a side of the second substrate facing the first substrate, and a TFT layer which comprises scan lines disposed on a side of the second substrate that faces the first substrate, and data lines intersecting with the scan lines;

wherein the common electrode layer comprises a plurality of first common electrodes and a plurality of second common electrodes both arranged in a matrix, wherein the first common electrodes and the second common electrodes are configured to detect a touched position on the in-cell touch panel liquid crystal display device;

wherein the first common electrodes are arranged in a first direction, and the second common electrodes are arranged in a second direction;

and wherein, the first common electrodes are disposed in the same direction with the scan lines, the second common electrodes are disposed in the same direction with the data lines, the first common electrodes are directly connected, and the second common electrodes are electrically connected by the metal bridges located in the same layer with the data lines; or the first common electrodes are disposed in the same direction with the data lines, the second common electrodes are disposed in the same direction with the scan lines, the first common electrodes are directly connected, and the second common electrodes are electrically connected by the metal bridges located in the same layer with the scan lines; or the first common electrodes are disposed in the same direction with the scan lines, the second common electrodes are disposed in the same direction with the data lines, the first common electrodes are electrically connected by metal bridges located in the same layer with the scan lines, and the second common electrodes are electrically connected by the metal bridges located in the same layer with the data lines.

2. The device of claim 1, wherein, comprises:
a plurality of scan lines disposed on a side of the second substrate that faces the first substrate;
data lines intersecting with the scan lines;
TFTs formed in pixel regions defined by the scan lines and the data lines, and the TFT comprises:
 a gate electrode electrically connected to one of the scan lines,
 a gate insulating layer,
 a semiconductor layer,
 source and drain electrodes disposed on the gate electrode, wherein the source electrode of the TFT is electrically connected to the data line,
wherein a pixel electrode disposed on a side of the second substrate which faces the first substrate is electrically connected to the drain electrode of the TFT.

3. The device of claim 1, further comprising a color filter layer disposed between the second substrate and the common electrode layer.

4. The device of claim 1, further comprising a display signal generating unit and a touch detecting signal generating unit, wherein the display signal generating unit is configured to provide a display signal to the first common electrodes and the second common electrodes, and the touch detecting signal generating unit is configured to provide a touch detecting signal to the first common electrodes and the second common electrodes.

5. The device of claim 4, wherein the display signal generating unit is configured to provide the display signal to the common electrode layer in the display mode, and the touch detecting signal generating unit is configured to provide the touch detecting signal to the common electrode layer in the touch mode.

6. The device of claim 5, wherein the touch detecting signal includes an excitation signal and a detection signal.

7. The device of claim 6, wherein in the touch mode, the touch detecting signal generating unit is configured to provide the excitation signal to the first common electrodes, and to provide the detection signal to the second common electrodes.

8. The device of claim 6, wherein in the touch mode, the touch detecting signal generating unit is configured to provide the excitation signal to the second common electrodes, and to provide the detection signal to the first common electrodes.

9. The device of claim 4, wherein the touch detecting signal generating unit is configured to provide the touch detecting signal to the common electrode layer simultaneously while the display signal generating unit provides the display signal to the common electrode layer.

10. The device of claim 9, wherein the touch detecting signal generating unit is configured to provide the excitation signal to the first common electrodes, and to provide the detection signal to the second common electrodes.

11. The device of claim 9, wherein the touch detecting signal generating unit is configured to provide the excitation signal to the second common electrodes, and to provide the detection signal to the first common electrodes.

12. The device of claim 9, wherein an equivalent DC component of the touch detecting signal is consistent with the display signal.

13. A method of driving an in-cell touch panel liquid crystal display device, the display device comprising: a first substrate, a second substrate disposed opposite the first substrate, a liquid crystal layer disposed between the first substrate and the second substrate, a common electrode layer disposed on a side of the second substrate facing the first substrate, and a TFT layer which comprises scan lines disposed on a side of the second substrate that faces the first substrate, and data lines intersecting with the scan lines, wherein the common electrode layer comprises a plurality of first common electrodes and a plurality of second common electrodes both arranged in a matrix, wherein the first common electrodes and the second common electrodes are configured to detect a touched position on the in-cell touch panel liquid crystal display device, wherein a common electrode layer of the device is time division multiplexed, wherein the first common electrodes are arranged in a first direction, and the second common electrodes are arranged in a second direction, wherein the method comprises:
 providing a display signal to the common electrode layer in a display mode; and
 providing a touch detecting signal to the common electrode layer in a touch mode;
and wherein,
 the first common electrodes are disposed in the same direction with the scan lines, the second common electrodes are disposed in the same direction with the data lines, the first common electrodes are directly connected, and the second common electrodes are electrically connected by the metal bridges located in the same layer with the data lines; or
 the first common electrodes are disposed in the same direction with the data lines, the second common electrodes are disposed in the same direction with the scan lines, the first common electrodes are directly connected, and the second common electrodes are electrically connected by the metal bridges located in the same layer with the scan lines; or
 the first common electrodes are disposed in the same direction with the scan lines, the second common electrodes are disposed in the same direction with the data lines, the first common electrodes are electrically connected by metal bridges located in the same layer with the scan lines, and the second common electrodes are electrically connected by the metal bridges located in the same layer with the data lines.

14. The method of claim 13, wherein the touch detecting signal comprises an excitation signal and a detection signal.

15. The method of claim 14, wherein in the touch mode, the excitation signal is provided to the first common electrodes and the detection signal is provided to the second common electrodes.

16. The method of claim 14, wherein in the touch mode, the excitation signal is provided to the second common electrodes and the detection signal is provided to the first common electrodes.

17. A method of driving an in-cell touch panel liquid crystal display device, the display device comprising: a first substrate, a second substrate disposed opposite the first substrate, a liquid crystal layer disposed between the first substrate and the second substrate, a common electrode layer disposed on a side of the second substrate facing the first substrate, and a TFT layer which comprises scan lines disposed on a side of the second substrate that faces the first substrate, and data lines intersecting with the scan lines, wherein the common electrode layer comprises a plurality of first common electrodes and a plurality of second common electrodes both arranged in a matrix, wherein the first common electrodes and the second common electrodes are configured to detect a touched position on the in-cell touch panel liquid crystal display device, wherein the first common electrodes are arranged in a first direction, and the second common electrodes are arranged in a second direction, wherein the method comprises:

simultaneously providing a display signal and a touch detecting signal to a common electrode layer of the in-cell touch panel liquid crystal display device; and detecting a touched position on the in-cell touch panel liquid crystal display device while displaying an image; and wherein, the first common electrodes are disposed in the same direction with the scan lines, the second common electrodes are disposed in the same direction with the data lines, the first common electrodes are directly connected, and the second common electrodes are electrically connected by the metal bridges located in the same layer with the data lines; or the first common electrodes are disposed in the same direction with the data lines, the second common electrodes are disposed in the same direction with the scan lines, the first common electrodes are directly connected, and the second common electrodes are electrically connected by the metal bridges located in the same layer with the scan lines; or the first common electrodes are disposed in the same direction with the scan lines, the second common electrodes are disposed in the same direction with the data lines, the first common electrodes are electrically connected by metal bridges located in the same layer with the scan lines, and the second common electrodes are electrically connected by the metal bridges located in the same layer with the data lines.

18. The method of claim 17, wherein the touch detecting signal comprises an excitation signal and a detection signal.

19. The method of claim 18, wherein the detection signal is provided to the second common electrodes while the excitation signal is provided to the first common electrodes.

20. The method of claim 18, wherein the detection signal is provided to the first common electrodes while the excitation signal is provided to the second common electrodes.

* * * * *